US010673492B2

(12) United States Patent
Cho

(10) Patent No.: US 10,673,492 B2
(45) Date of Patent: *Jun. 2, 2020

(54) POINT-TO-MULTIPOINT COMMUNICATION SYSTEM IN WHICH AUTOMATIC ID ALLOCATION IS POSSIBLE

(71) Applicant: SOLiD, INC., Seongnam-si, Gyeonggi-do (KR)

(72) Inventor: Yong Ki Cho, Yongin-si (KR)

(73) Assignee: SOLiD, INC., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/118,793

(22) Filed: Aug. 31, 2018

(65) Prior Publication Data

US 2018/0375549 A1    Dec. 27, 2018

Related U.S. Application Data

(63) Continuation of application No. 14/411,484, filed as application No. PCT/KR2014/006531 on Jul. 18, 2014, now Pat. No. 10,079,622.

(30) Foreign Application Priority Data

Mar. 29, 2014   (KR) .......................... 10-2014-0037348

(51) Int. Cl.
*H04B 7/024* (2017.01)
*H04L 29/06* (2006.01)
(Continued)

(52) U.S. Cl.
CPC ........... *H04B 7/024* (2013.01); *H04L 5/0048* (2013.01); *H04L 69/22* (2013.01); *H04W 72/0406* (2013.01)

(58) Field of Classification Search
CPC ....... H04L 5/0048; H04L 69/22; H04B 7/024; H04W 72/0406
See application file for complete search history.

(56) References Cited

U.S. PATENT DOCUMENTS 6,804,521 B2    10/2004   Tong et al.
2007/0025734 A1  2/2007   Oogushi et al.
(Continued)

FOREIGN PATENT DOCUMENTS

KR    10-2003-0016561    3/2003
KR    10-2013-0114774    10/2013

OTHER PUBLICATIONS

International Search Report issued in PCT/KR2014/006531 dated Jul. 18, 2014.
(Continued)

*Primary Examiner* — Gary Mui
(74) *Attorney, Agent, or Firm* — Sughrue Mion, PLLC

(57) ABSTRACT

There is provided a first unit which constitutes a point-to-multipoint communication system and is connected to communicate with each of a plurality of second units. The first unit includes a control signal extraction unit, a signal switching unit and a controller. The control signal extraction unit extracts first control signals respectively transmitted from the plurality of second units. The signal switching unit includes a switching circuit, and selects any one of the first control signals respectively received through individual signal transmission lines. The controller receives the first control signal selected by the signal switching unit, determines an allocation ID to be allocated to a second unit corresponding to the selected first control signal based on the initial identification information of the selected first control signal, and controls the determined allocation ID to be transmitted to the corresponding second unit.

15 Claims, 3 Drawing Sheets

(51) Int. Cl.
    *H04L 5/00*     (2006.01)
    *H04W 72/04*    (2009.01)

(56)          References Cited

U.S. PATENT DOCUMENTS

2009/0208204 A1   8/2009   Zhang et al.
2010/0085926 A1   4/2010   Harada et al.
2014/0355493 A1   12/2014  Niu et al.
2015/0326502 A1   11/2015  Namihira

OTHER PUBLICATIONS

Written Opinion issued in PCT/KR2014/006531 dated Dec. 15, 2014.
Office Action issued in parent U.S. Appl. No. 14/411,484 dated Jun. 1, 2017.
Office Action issued in parent U.S. Appl. No. 14/411,484 dated Dec. 22, 2017.
Notice of Allowance issued in parent U.S. Appl. No. 14/411,484 dated May 16, 2018.

POINT-TO-MULTIPOINT COMMUNICATION SYSTEM IN WHICH AUTOMATIC ID ALLOCATION IS POSSIBLE

CROSS REFERENCE TO RELATED APPLICATION

This application is a Continuation of U.S. patent application Ser. No. 14/411,484, filed on Dec. 26, 2014, which is a 371 of PCT/KR2014/006531 filed on Jul. 18, 2014, and which claims priority from Korean Patent Application No. 10-2014-0037348, filed on Mar. 29, 2014, in the Korean Intellectual Property Office, the contents of which are incorporated herein by reference in their entireties.

TECHNICAL FIELD

The present invention relates to an automatic ID allocation method in a point-to-multipoint communication system and a point-to-multipoint communication system using the same.

BACKGROUND ART

Generally, in a point-to-multipoint communication system including a donor unit and a plurality of remote units, a downlink information signal and a downlink control signal are transmitted from the donor unit to the plurality of remote units in a broadcasting manner. In this state, a unique ID is required for each remote unit for the purpose of communication between the donor unit and the remote unit. When the plurality of remote units simultaneously transmit control signals to the donor unit in a state in which the unique ID is not allocated to each remote unit, it is difficult to distinguish between the remote units that have transmitted the control signals, and collision between the control signals may occur.

However, according to a conventional art, in order to allocate a unique ID to each remote unit, a field worker should allocate, in a direct manual manner, an ID to a corresponding remote unit at an installation position of the remote unit. For example, there is an inconvenience in that the field worker should set port #1 of the donor unit and remote unit #1 one by one so that the port #1 of the donor unit and the remote unit #1 are connected to each other. In this process, there is a problem that a setting error occurs, and the like.

SUMMARY

An embodiment of the present invention is directed to an automatic ID allocation method in a point-to-multipoint communication system and a point-to-multipoint communication system using the same.

According to an aspect of the present invention, a first unit which constitutes a point-to-multipoint communication system and is connected to communicate with each of a plurality of second units, the first unit includes: a control signal extraction unit configured to extract first control signals respectively transmitted from the plurality of second units, wherein each first control signal includes a unique initial identification information for each second unit; a signal switching unit configured to include a switching circuit, the signal switching unit selecting any one of the first control signals respectively received through individual signal transmission lines; and a controller configured to receive the first control signal selected by the signal switching unit, determine an allocation ID to be allocated to a second unit corresponding to the selected first control signal based on the initial identification information of the selected first control signal, and control the determined allocation ID to be transmitted to the corresponding second unit, wherein the allocation ID includes configuration information of the corresponding second unit in the point-to-multipoint communication system.

The first unit may include a plurality of communication ports provided to correspond to the respective second units, the plurality of communication ports each being connected to each second unit through an individual signal transmission medium. The configuration information of the corresponding second unit to be included in the allocation ID may be information on a port connected to the corresponding to the second unit among the plurality of communication ports. The allocation ID may include the port information and identification information of the corresponding second unit.

The first control signal may be transmitted together with an uplink information signal transmitted from the second unit to the first unit through an uplink signal transmission path. The control signal extraction unit may separate only the first control signal from the uplink information signal received through the uplink signal transmission path in the first unit and the first control signal, so that the separated first control signal is transmitted to the signal switching unit.

The first control signal may be a signal having a frequency band distinguished from that of the uplink information signal. The control signal extraction unit may include a control signal removal unit configured to include a band stop filter positioned on the uplink signal transmission path in the first unit, to remove a signal of a frequency band corresponding to that of the first control signal from the uplink information signal and the first control signal; and a control signal separation unit disposed prior to an input terminal of the band stop filter based on an uplink signal transmission direction, the control signal separation unit including a band pass filter positioned on a signal branch path branched from the uplink signal transmission path in the first unit, to pass a signal of a frequency band corresponding to that of the first control signal from the uplink information signal and the first control signal.

Individual uplink signal transmission paths corresponding to the respective second units may be formed in the first unit. The control signal extraction unit may be disposed on each uplink signal transmission path corresponding to each second unit. The signal switching unit may receive a plurality of first control signals transmitted from the plurality of control signal extraction units disposed on the respective uplink signal transmission paths through different signal branch paths.

The signal switching unit may include switches respectively disposed on the different signal branch paths where the plurality of first control signals are received. The controller may control operations of a plurality of switches provided in the signal switching unit, to allow only any one of the plurality of switches to be switched on, thereby selecting only any one of the plurality of first control signals received from the plurality of second units.

The controller may determine an allocation ID to be mapped to each second unit in such a manner that the operation of the plurality of switches are sequentially switched on, and control the determined allocation ID to be transmitted to each second unit along a downlink signal transmission path provided for each second unit.

The allocation ID may be included in a downlink information signal or a downlink control signal to be transmitted to the corresponding second unit.

According to another aspect of the present invention, a point-to-multipoint communication system including the first unit and a plurality of second units connected to communicate with the first unit, the point-to-multipoint communication system wherein each second unit includes a controller, when an allocation ID is transmitted from the first unit, configured to register the transmitted allocation ID, generate a second control signal including the registered allocation ID, and control the second control signal to be transmitted together with an uplink information signal to the first unit through an uplink signal transmission path.

In initial setting of a signal transmission path between the second unit and the first unit, the controller of the second unit may generate the first control signal including unique initial identification information of the second unit, and control the first control signal to be transmitted to the first unit through the signal transmission path.

The second control signal may be generated as a signal of a frequency band equal to that of the first control signal. When an allocation ID is transmitted to each second unit or when the second control signal is received, the controller of the first unit may control the operation of the signal switching unit so that a plurality of second control signals respectively received from the plurality of second units pass through the different signal branch paths and then are again transmitted through the uplink signal transmission path.

According to the present invention, in the point-to-multipoint communication system such as a distributed antenna system, automatic ID allocation is possible in such a manner that separates and switches a control signal transmitted for each remote unit, so that it is possible to reduce time and errors, caused in directly setting an ID for each remote unit when the remote unit is initially installed. Further, although the port position of an equipment is changed, the identification of a remote unit can be automatically performed.

DETAILED DESCRIPTION

Figure 1:
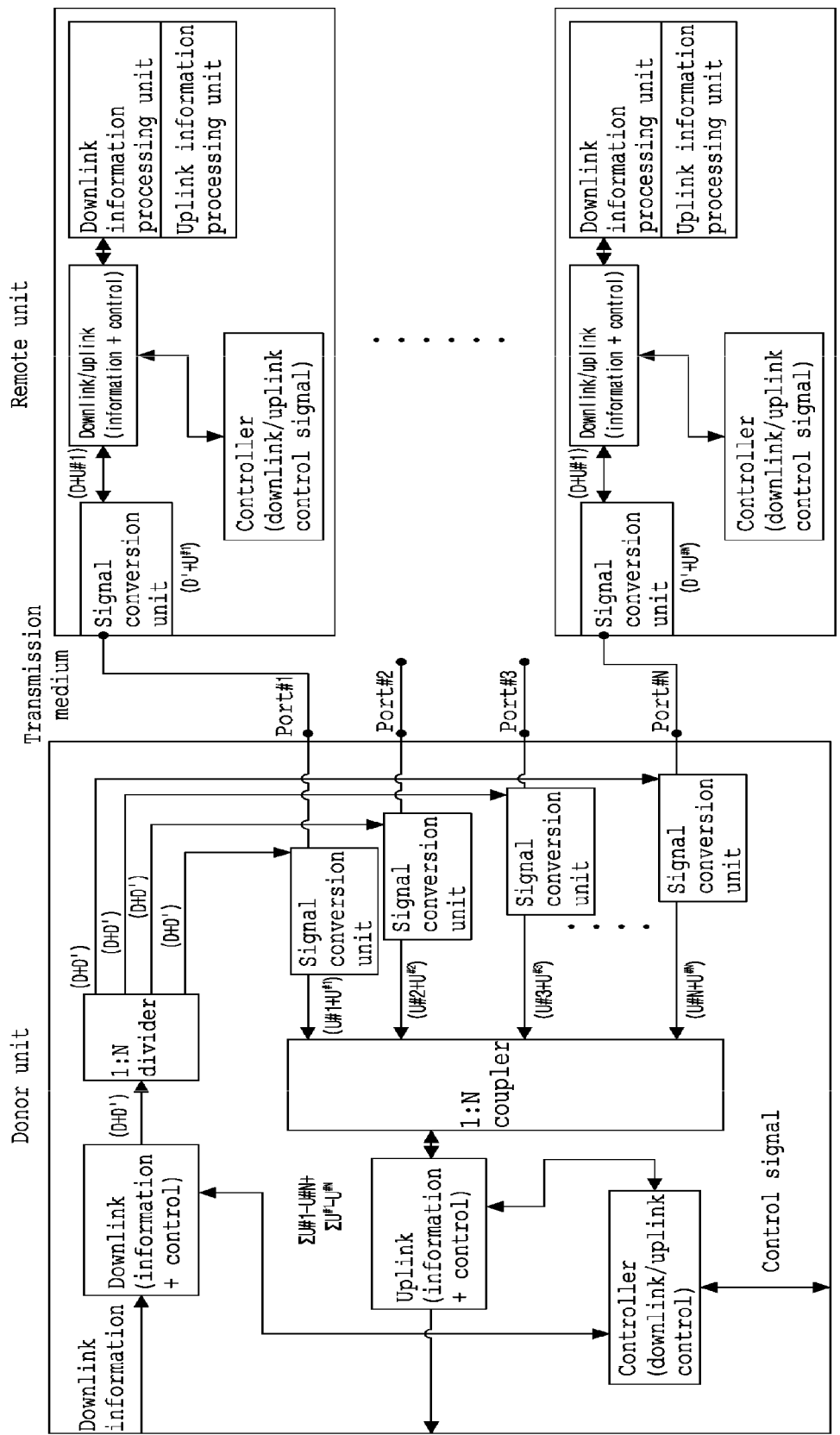
FIG. 1 is a diagram illustrating an embodiment of a distributed antenna system including a donor unit and a plurality of remote units, as an example of a point-to-multipoint communication system.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Throughout the description of the present invention, when describing a certain technology is determined to evade the point of the present invention, the pertinent detailed description will be omitted. Numerals (e.g., first, second, etc.) used in the description of the present invention are only for distinguishing one element from another element.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

Figure 2:
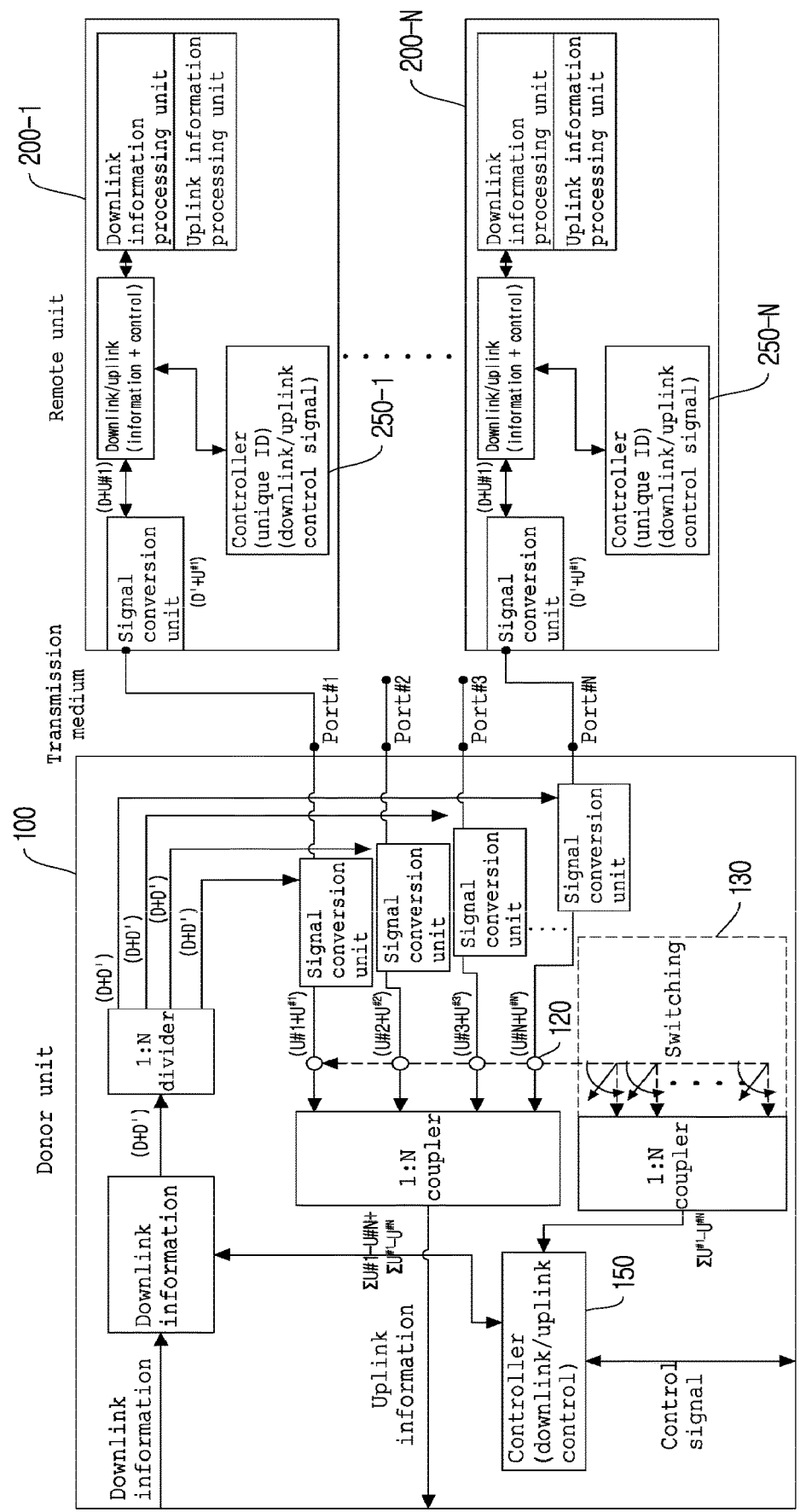
FIG. 2 is a diagram illustrating a point-to-multipoint communication system in which automatic ID allocation is possible according to an embodiment of the present invention.
Figure 3:
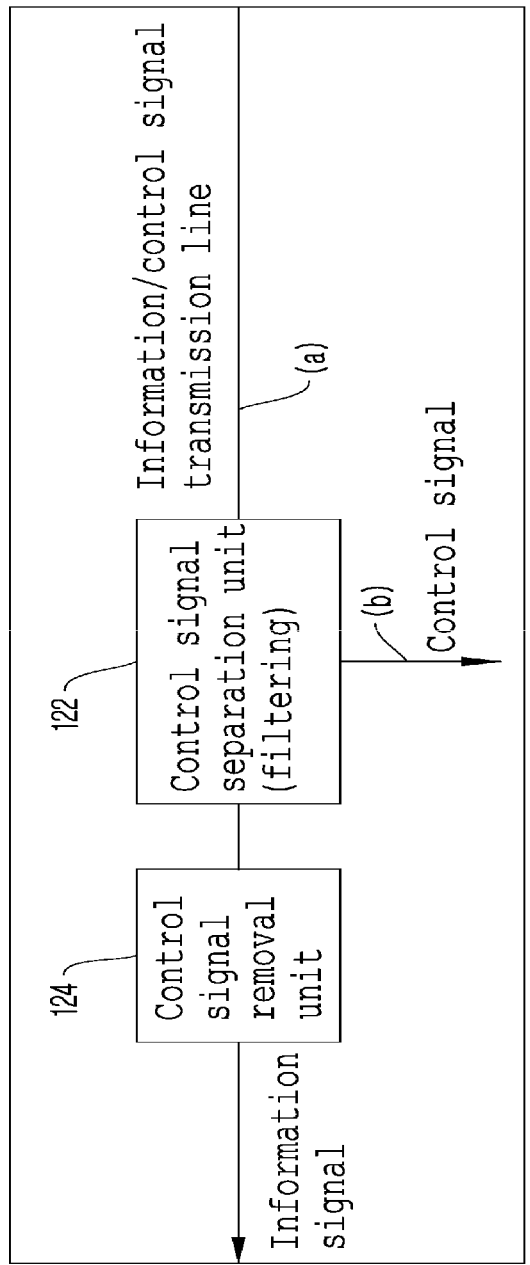
FIG. 3 is a block diagram illustrating a control signal extraction unit in FIG. 2.

FIG. 1 is a diagram illustrating an embodiment of a distributed antenna system including a donor unit and a plurality of remote units, as an example of a point-to-multipoint communication system. FIG. 2 is a diagram illustrating a point-to-multipoint communication system in which automatic ID allocation is possible according to an embodiment of the present invention. FIG. 3 is a block diagram illustrating a control signal extraction unit in FIG. 2.

In the point-to-multipoint communication system according to the embodiment of the present invention, when being compared with FIG. 1, a control signal extraction unit 120 and a signal switching unit 130 are further provided in a donor unit 100 in order to perform automatic ID allocation on each remote unit. In this state, a controller 150 of the donor unit 100 and controllers (see 250-1 and 250-N) of the respective remote units (see 200-1 and 200-N) have a predetermined function for performing automatic ID allocation. That is, FIG. 2 illustrates that a configuration and a function for performing automatic ID allocation for each remote unit according to the embodiment of the present invention are further added based on the configuration of an example of the point-to-multipoint communication system as shown in FIG. 1. Thus, it is obvious that, when the basic configuration and structure of the point-to-multipoint communication system is different from those of FIG. 1, the embodiment of the present invention will also be changed suitable for the different configuration and structure of the point-to-multipoint communication system. Therefore, it will be apparent that, if the key function and configuration of the present invention, which will be described below, are included, the present invention is not necessarily limited to the structure and configuration of FIG. 2.

In this specification, a method will be described which automatically allocates an ID to each remote unit in a case where a plurality of remote units are connected to one donor unit in a point-to-multipoint manner based on FIG. 2. However, the present invention may be substantially equally applied to even a case where another plurality of remote units are connected to one remote unit in the point-to-multipoint manner according to an embodiment.

Referring to FIG. 2, the donor unit 100 is individually connected to N remote units 200-1 to 200-N through different ports. The donor unit 100 and the N remote units 200-1 to 200-N are connected through a transmission medium. Here, the transmission medium is not necessarily limited to a wired medium (a twist pair cable, a coaxial cable, an optic fiber, or the like), and may be a wireless medium. In this state, a signal conversion unit of the donor unit 100 and signal conversion units of the respective remote units 200-1 to 200-N perform signal conversion according to the transmission medium. For example, when the transmission medium is an optic fiber, the signal conversion unit may include a configuration for electro-optic conversion and optic-electro conversion.

In order to implement the point-to-multipoint communication system, when the donor unit 100 and the N remote units 200-1 to 200N are initially connected for each port, each remote controller 250-1 to 250-N individually provided in each remote unit 200-1 to 200-N generates a first control signal and transmits the generated first control signal to the donor unit 100. Here, unique initial identification information (e.g., the MAC address of a corresponding equipment, an initially set ID, etc.) for each remote unit may be included in the first control signal. According to an embodiment, the first signal may be combined together with an uplink information signal transmitted from each remote unit, to be transmitted to the donor unit through a predetermined uplink signal transmission path.

If the uplink information signal and the first control signal are transmitted to the donor unit 100, the control signal extraction unit 120 of the donor unit 100 separates only the first control signal from the uplink information signal and the first control signal. A configuration example of the control signal extraction unit 120 is illustrated in FIG. 3. Referring to FIG. 3, the control signal extraction unit 120 includes a control signal separation unit 122 and a control signal removal unit 124. Here, the control signal removal unit 124 is positioned on an uplink signal transmission path (see identification symbol (a) of FIG. 3), and performs a function of removing the first control signal from the uplink information signal and the first control signal, transmitted along the uplink signal transmission path (a). To this end, the control signal removal unit 124 may include a band stop filter for removing a signal of a frequency band corresponding to that of the first control signal. The control signal separation unit 122 is disposed prior to the control signal removal unit 124 based on an uplink signal transmission direction. The control signal separation unit 122 is positioned on a signal branch path (see identification symbol (b) of FIG. 3) branched from the uplink signal transmission path (a), and performs a function of separating only the first control signal from the uplink information signal and the first control signal. To this end, the control signal separation unit 122 may include a band pass filter for passing only a signal of a frequency band corresponding to that of the first control signal. In order to perform the separation and removal of only the first control signal, the first control signal may have a frequency band distinguished from that of the uplink information signal. However, the configuration example of FIG. 3 is merely an example, and may be variously modified within the limit where the substantially same function is performed.

The control signal extraction unit 120 described above is provided on an uplink signal transmission path for each port, and each control signal extraction unit 120 is connected to the signal switching unit 130 through an individual signal transmission line. Accordingly, each first control signal transmitted from each remote unit 200-1 to 200-N can be transmitted to the signal switching unit 130 via each control signal extraction unit 120.

The signal switching unit 130 includes switching circuits, to select any one of the first control signals received through the respective individual signal branch paths. For example, the signal switching unit 130 may include switches disposed on the respective individual signal branch paths, and the controller 150 may allow any one of the plurality of switches provided in the signal switching unit 130 to be switched on by controlling operations of the plurality of switches, thereby selecting only a specific first control signal.

As described above, when only a specific first control signal is selected, the controller 150 receives the selected first control signal and determines an allocation ID to be allocated (mapped) to a remote unit corresponding thereto (i.e., the remote unit that has transmitted the selected first control signal) based on initial identification information included in the received first control signal. Here, configuration information that enables the configuration position of a corresponding remote unit in the point-to-multipoint communication system, and the like to be identified may be included in the allocation ID. As an example, information on a port to which a corresponding remote unit is connected may be used as the configuration information. That is, in the automatic allocation of an ID to the identified remote unit, the controller 150 may use a new ID obtained by combining port information and information capable of identifying the corresponding remote unit (the information may be the initial individual information, but may be identification information newly selected in a mapping process, e.g., information on a name to be newly provided).

The allocation ID newly defined as described above is again transmitted to the corresponding remote unit through the original downlink signal transmission path by control of the controller 150. In this state, the new allocation ID may be included a downlink information signal or a downlink control signal, to be transmitted to the corresponding remote unit. Accordingly, the controller (250-1 or 250-N of FIG. 2) of the corresponding remote unit registers the transmitted allocation ID. In a subsequent communication process, the remote unit performs communication with the donor unit using the newly registered allocation ID. For example, the remote unit may generate a second control signal including the registered allocation ID and use the generated second signal in a subsequent communication process. In this state, the second control signal may have a frequency band equal to that of the first control signal.

The automatic ID allocation process described above is performed on all the remote units. To this end, the controller 150 of the donor unit 100 may determine, in such a manner that a plurality of switches are sequentially switched on one by one, an allocation ID for each remote unit corresponding to each switch, and control the determined allocation ID to be transmitted to each remote unit.

As described above, according to the embodiment of the present invention, in the point-to-multipoint communication system, an ID can be automatically allocated for each remote unit without relying on ID allocation in a manual manner of a field worker. Also, according to the embodiment of the present invention, when there occurs a change in configuration, including replacement, addition or the like of an equipment, an ID can be automatically allocated according to the change. After the automatic ID allocation is completed as described above (or when the second control signal is received from the remote unit), the controller 150 of the donor unit 100 may control the operation of the signal switching unit 130 so that all the second control signals received from the respective remote units can be normally transmitted through the uplink signal transmission paths. This is because, after the initial setting is completed, all the second control signals transmitted from the respective remote units are to be transmitted in the direction of a network management system (NMS).

While the present invention has been described with respect to the specific embodiments, it will be apparent to those skilled in the art that various changes and modifications may be made without departing from the spirit and scope of the invention as defined in the following claims.

The invention claimed is:

1. A first unit which constitutes a communication system and is connected to communicate with each of a plurality of second units, the first unit comprising:
a memory to store instructions; and a processor, coupled to the memory, to facilitate execution of the instructions to perform operations, comprising:
extracting first control signals respectively transmitted from the plurality of second units, wherein each first control signal includes a unique initial identification information for each second unit;
selecting any one of the first control signals respectively received through individual signal transmission media;
determining an allocation ID to be allocated to a second unit corresponding to the selected first control signal based on the unique initial identification information of the selected first control signal;
transmitting the determined allocation ID to the second unit so that the second unit registers the determined allocation ID and generates a second control signal including the registered allocation ID; and
receiving the second control signal from the second unit among the plurality of second units based on the allocation ID, wherein the allocation ID includes configuration information of the second unit in the communication system.

2. The first unit of claim 1, wherein the first unit includes a plurality of communication ports provided to correspond to the respective second units, the plurality of communication ports each being connected to each second unit through the individual signal transmission media,
wherein the configuration information of the second unit to be included in the allocation ID is information on a port corresponding to the second unit among the plurality of communication ports, and
wherein the allocation ID includes the port information and identification information of the second unit.

3. The first unit of claim 2, wherein the second unit transmits an uplink signal including the first control signal and an uplink information signal to the first unit through an uplink signal transmission path, and
wherein the operations further comprise separating only the first control signal from the uplink signal received through the uplink signal transmission path in the first unit.

4. The first unit of claim 3, wherein the first control signal is a signal having a frequency band distinguished from that of the uplink information signal, and
wherein the operations further comprise separating a signal of a frequency band corresponding to the first control signal from the uplink signal.

5. The first unit of claim 1, wherein the operations further comprise:
determining an allocation ID to be mapped to each second unit; and
transmitting the determined allocation ID to each second unit along a downlink signal transmission path provided for each second unit.

6. The first unit of claim 1, wherein the allocation ID is included in a downlink information signal or a downlink control signal to be transmitted to the second unit.

7. A communication system comprising the first unit of claim 1 and a plurality of second units connected to communicate with the first unit, each second unit comprising:
a memory to store instructions; and
a processor, coupled to the memory, to facilitate execution of the instructions to perform operations, comprising:
registering a transmitted allocation ID transmitted from the first unit;
generating a second control signal including the registered allocation ID; and
transmitting the second control signal together with an uplink information signal to the first unit through an uplink signal transmission path.

8. The communication system of claim 7, wherein the operation further comprise:
generating the first control signal including unique initial identification information of the second unit; and
transmitting the first control signal to the first unit through the signal transmission path.

9. The communication system of claim 7, wherein the operation further comprise:
generating the second control signal as a signal of a frequency band equal to the first control signal.

10. A method for operating of a first unit which constitutes a communication system and is connected to communicate with each of a plurality of second units, the method comprising:
extracting first control signals respectively transmitted from the plurality of second units, wherein each first control signal includes a unique initial identification information for each second unit;
selecting any one of the first control signals respectively received through individual signal transmission media;
determining an allocation ID to be allocated to a second unit corresponding to the selected first control signal based on the unique initial identification information of the selected first control signal;
transmitting the determined allocation ID to the second unit so that the second unit registers the determined allocation ID and generates a second control signal including the registered allocation ID; and
receiving the second control signal from the second unit among the plurality of second units based on the allocation ID, wherein the allocation ID includes configuration information of the second unit in the communication system.

11. The method of claim 10, wherein the first unit includes a plurality of communication ports provided to correspond to the respective second units, the plurality of communication ports each being connected to each second unit through the individual signal transmission media,
wherein the configuration information of the second unit to be included in the allocation ID is information on a port corresponding to the second unit among the plurality of communication ports, and
wherein the allocation ID includes the port information and identification information of the second unit.

12. The method of claim 11, wherein the second unit transmits an uplink signal including the first control signal and an uplink information signal to the first unit through an uplink signal transmission path, and
wherein the method further comprises separating only the first control signal from the uplink signal received through the uplink signal transmission path in the first unit.

13. The method of claim 12, wherein the first control signal is a signal having a frequency band distinguished from that of the uplink information signal, and
wherein the method further comprises separating a signal of a frequency band corresponding to that of the first control signal from the uplink signal.

14. The method of claim 10, further comprises:
determining an allocation ID to be mapped to each second unit; and
transmitting the determined allocation ID to each second unit along a downlink signal transmission path provided for each second unit.

15. The method of claim 10, wherein the allocation ID is included in a downlink information signal or a downlink control signal to be transmitted to the second unit.

\* \* \* \* \*